(12) United States Patent
Hallak

(10) Patent No.: US 11,705,813 B2
(45) Date of Patent: Jul. 18, 2023

(54) SYSTEM AND METHOD FOR REGULATING A SWITCHING CONVERTER HAVING AT LEAST ONE SWITCHING ELEMENT IN A QUASI-RESONANT OPERATION

(71) Applicant: Siemens Aktiengesellschaft, Munich (DE)

(72) Inventor: Jalal Hallak, Vienna (AT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/472,803

(22) Filed: Sep. 13, 2021

(65) Prior Publication Data

US 2022/0085722 A1 Mar. 17, 2022

(30) Foreign Application Priority Data

Sep. 14, 2020 (EP) .................................... 20195998

(51) Int. Cl.
  *H02M 3/335* (2006.01)
  *H02M 1/00* (2006.01)

(52) U.S. Cl.
  CPC ..... *H02M 3/33507* (2013.01); *H02M 1/0003* (2021.05); *H02M 1/0058* (2021.05)

(58) Field of Classification Search
  None
  See application file for complete search history.

(56) References Cited

U.S. PATENT DOCUMENTS 9,083,250 B2    7/2015  Adragna
9,112,403 B2 *  8/2015  Hallak ................... H02M 3/04
(Continued)

FOREIGN PATENT DOCUMENTS

CN    109067213    12/2018
CN    111490681     8/2020
(Continued)

OTHER PUBLICATIONS

Infinion Technologies AG: "Ouasi-Resonant PWM Controller ICE2QS03 Datasheet"; Version 2.2; 4. Jul. 2011 pp. 1-19, 2011.
(Continued)

*Primary Examiner* — Jeffrey A Gblende
(74) *Attorney, Agent, or Firm* — Cozen O'Connor

(57) ABSTRACT

System and method via which a switching element is switched in a regulated state of a switching converter at a predetermined stable switching frequency, wherein a switch-on point of the switching element is predetermined by a switching signal generated via a sawtooth signal reaching/exceeding a switch-on threshold value such that the switch-on point of the switching element falls in a valley of an oscillating voltage prevailing at the switched-off switching element, where a prevailing period duration of the switching signal is continuously determined to detect the period duration that is compared with a predetermined reference period duration of a period duration reference unit, a control variable is generated from the comparison and a gap is changed between the sawtooth signal, which is influenced with the valley-identifying signal, and the switch-on threshold value until ascertaining, with reference to the determined prevailing period duration, the stable switching frequency has been reached.

14 Claims, 2 Drawing Sheets

(56) References Cited

U.S. PATENT DOCUMENTS

| | | | |
|---|---|---|---|
| 10,243,472 B2* | 3/2019 | Schaemann | H02M 3/33523 |
| 11,418,105 B2* | 8/2022 | Radic | H02M 1/08 |
| 2011/0182088 A1 | 7/2011 | Lidak et al. | |
| 2011/0317459 A1 | 12/2011 | Kuebrich et al. | |
| 2019/0252966 A1 | 8/2019 | Radic | |

FOREIGN PATENT DOCUMENTS

| | | |
|---|---|---|
| CN | 111869080 | 10/2020 |
| EP | 2173026 | 4/2010 |

OTHER PUBLICATIONS

EP Search Report dated Mar. 16, 2020 based on EP20195998 filed Sep. 14, 2020.

\* cited by examiner

SYSTEM AND METHOD FOR REGULATING A SWITCHING CONVERTER HAVING AT LEAST ONE SWITCHING ELEMENT IN A QUASI-RESONANT OPERATION

BACKGROUND OF THE INVENTION

1. Field of the Invention

The invention generally relates to the field of electrical engineering, in particular the sector of power electronics and also power electronic circuits and, more particularly, to a system and method for regulating a switching converter having at least one switching element, where the switching converter is operated in a quasi-resonant operation and the at least one switching element of the switching converter is switched in a regulated state of the switching converter at a predetermined stable switching frequency, where a switch-on point in time of the switching element is predetermined by a switching signal of a switching regulating unit and the switching signal is generated via a sawtooth signal reaching or exceeding a switch-on threshold value, where the sawtooth signal is influenced with a valley-identifying signal such that the switch-on point in time of the at least one switching element falls in a valley of an oscillating voltage that is prevailing at the switched-off switching element.

2. Description of the Related Art

Switching converters are used in many sectors (for example, automation, or the automotive sector) and refer to technologies for voltage conversion and/or current conversion as a basis for a supply of a load or a consumer, such as an electrical device or an assembly having a voltage that is mostly constant and can frequently be predetermined. For this purpose, typically an input voltage (for example, a DC voltage or AC voltage that originates from a current source) is converted by a switching converter into a constant output voltage. A constancy of the output voltage is typically achieved by controlling an energy flow that is controlled with the aid of at least one periodically clocking or operating switching element and with the aid of at least one energy storage device (for example, coil, transformer, or capacitor). Depending on the application, it is possible to use different switching converter topologies (for example, step-down converters, step-up converters, step-down/step-up converters, or flyback converters) for the current supply of a load in order to generate an output voltage that is greater than, smaller than or where applicable identical to the input voltage.

Switching elements, such as transistors, contain parasitic capacitances as well as coils, transformers or inductors that in the case of "hard" switching converters (in other words, in the case of converters having fixed switching frequency) to switching losses and/or emitted interferences (for example, in the form of noises and/or electromagnetic radiation—"EMV" interference). In the case of a discontinuous or an intermittent operating mode (DCM) of a switching converter, for example, the at least one switching element of the switching converter is switched on after the inductance or coil of the switching converter has been demagnetized whereby a dead time occurs. During this dead time, in the case of hard switching converters the parasitic capacitances oscillate with the inductance of the converter about the input voltage or intermediate circuit voltage and can be charged prior to the next switch-on point in time to accordingly high voltages. As a switching element of the converter is switched on in the next clock cycle, these parasitic capacitances are discharged or recharged for example via the switching element (for example, transistor, etc.) and, in this case, depending on the voltage that is prevailing generate more or fewer high current peaks that in the case of accordingly high voltage lead to accordingly high switching losses. Furthermore, current peaks of this type are rich in harmonics, which additionally increases interference or the EMI.

In order to minimize these switching losses and also the interference, it is possible to operate the switching converter in a "quasi-resonant mode" or for the at least one switching element of the converter to pursue "quasi-resonant switching". In the case of quasi-resonant switching, for example, via an identification circuit or an identification circuitry, a minimum (also referred to as "valley") of the drain source voltage of the at least one switching element of the converter is effectively detected and the switching element is only switched on at this point in time. The parasitic capacitance is changed to the minimum voltage. As a result, in this manner, the switch-on current peak is minimized and the switching losses and the interference are reduced. This type of switching of the switching element or the switching converter is referred to in general as valley switching, zero crossing switching or quasi-resonant switching. Each minimum of the oscillating voltage that is prevailing at the switched-off switching element of the converter is referred to as a valley. In this case, a valley that occurs chronologically first during a switching period is referred to as the first valley. The subsequent valleys are referred to according to their chronological sequence as the second, third, fourth etc. valley.

A switch-on point in time is typically predetermined for the at least one switching element of the converter by a switching signal of a switching regulating unit. Typically, a pulse width modulation or PWM switching regulator is used to generate the switching signal. Here, a switch-on pulse is generated for the switching element in the switching signal (for example, rising flank of a square wave signal) owing to a sawtooth signal reaching a switch-on threshold value. In order to switch-on the at least one switching element of the converter in a valley, it is possible, for example, as described in the document EP 2 173 026 B1, to influence the sawtooth signal with a valley identifying signal. As a consequence, it is achieved that the switch-on point in time of the switching element falls in a valley of the oscillating voltage that is prevailing at the switched-off switching element.

The switch-on during a valley causes a running reset of the period start (pulse reset) and consequently an adaptation of the switching frequency independent of the load or an intermediate circuit voltage at this point in time. If the switching element, for example, is always switched on at the same (for example first) valley, then the switching frequency increases with decreasing load until a maximum frequency is reached in the idle running state. However, the switching losses also increase with increasing frequency because more loss-bringing switching procedures occur per time unit. In order to avoid switching frequencies that are too high in the case of a low load or in the idle running state, such as when the maximum switching frequency, which is predetermined by the dimensioning of the switching converter, is reached, in general the switch-on point in time of the at least one switching element of the switching converter is relocated to a later valley. This means that in the case of a decreasing load or a decreasing output power of the converter, for example, the switch-on point in time of the switching element is relocated from a prevailing valley to a later valley, such as from the third valley to the fourth valley.

In a similar manner, in the case of an increasing load or an increasing power requirement at the output of the converter, the switching frequency starts to reduce until a minimum switching frequency, which is predetermined by the dimensioning of the switching converter, is reached. In order to prevent the switching frequency from falling below the predetermined minimum value, the switch-on point in time of the at least one switching element is relocated to an earlier valley. This means that, in the case of an increasing load or an increasing output power of the converter, in lieu of in a prevailing valley, the switching element, for example, is switched on in an earlier valley, such as in the third valley in lieu of in the fourth valley.

It is possible, by changing between the valleys after changing the load (for example, from the idle state to the full load), for example, to achieve the ability of the switching converter or the at least one switching element of the switching converter to be switched in a regulated state at an approximately identical, stable switching frequency. This means that, at this stable switching frequency, the switching converter operates in a stable operating point. The stable switching frequency is typically predetermined by the inductances and capacitances and degree of efficiency of the switching converter and can be determined, for example, from the maximum and minimum value of the switching frequency (for example, arithmetic average).

A change in the load or in the power requirement at the output of the switching converter and a consequently necessary change between the valleys can, however, produce an unstable state of the regulating procedure. A load change at the output of the switching converter leads, for example, to a change of the output voltage of the switching converter, which leads to a change of an adjusting variable for a regulation of the output voltage and a change of the switch-off point in time of the switching element of the switching converter. For example, in the case of an increasing load, the valley-identifying signal influences the sawtooth signal of the switching regulating unit at a later point in time owing to the change of the switch-off point in time of the switching element. In the case of a decreasing load, the point in time at which the valley-identifying signal would have influenced the sawtooth signal is brought forward temporally.

The switch-on point in time of the switching element is determined owing to the sawtooth signal, which is influenced with the valley-identifying signal, reaching or exceeding the switch-on threshold value. Consequently, it is possible for a load change to lead to the fact that, for example, two valley identifying signals reach or exceed the switched-on threshold value. That means that depending upon the load change the switch-on point in time of the switching element is changed by the switching regulating unit from a prevailing valley to an earlier or later valley. As a consequence, the switching frequency is changed and consequently an abrupt change occurs in the power that is transmitted by the switching converter. In order to compensate the power change, the output voltage is regulated back by the voltage regulation of the switching converter and where applicable is switched back to the valley prior to the prevailing valley. Here, the switch-on behavior of the switching element can lead to an unstable state for the regulation of the output voltage of the switching converter whereby the pulse modulated switching regulating unit is compelled to jump back and forth continuously between two consecutive valleys, such as between the third and the fourth valley, in an uncontrolled manner. This effect is referred to as "valley skipping" or "valley hopping". As a result of valley skipping, a limit cycle oscillation occurs in the regulating circuit with an oscillating frequency in the audible range (for example 5 to 15 kHz) and a higher power loss occurs.

SUMMARY OF THE INVENTION

It is an object of the invention to provide an improved quasi-resonant switching switching converter such a manner that uncontrolled valley skipping is avoided.

This and other objects and advantages are achieved in accordance with the invention by a method via which a switching converter is operated with at least one switching element in a quasi-resonant operation or mode. The at least one switching element is switched in this case in a regulated state of the switching converter at a predetermined stable switching frequency. Furthermore, switch-on points in time are predetermined for the at least one switching element by a switching signal that is generated owing to a sawtooth signal, which is influenced with a valley-identifying signal, reaching a switch-on threshold value, where owing to the valley-identifying signal a respective switch-on point in time of the at least one switching element falls in a valley of an oscillating voltage that is prevailing at the switched-off switching element. Furthermore, for example, a prevailing period duration of the switching signal is continuously determined and the determined prevailing period duration of the switching signal is compared with a predetermined reference period duration. A control variable is derived from a comparison of the determined prevailing period duration with the reference period duration and, in the event of a change of a load at the output of the switching converter, a gap between the sawtooth signal, which is influenced with the valley-identifying signal, and the switch-on threshold value is changed until with reference to the determined, prevailing period duration, ascertaining that the predetermined stable switching frequency has been reached.

The main aspect of the system and method in accordance with the invention in particular is in the fact that in the case of a change in the load at the output of the switching converter, an abrupt change is rendered possible between a prevailing valley so as to derive the switch-on point in time of the switching element to an earlier or later valley (according to the respective load change). Here, in the case of a change in the load at the output of the switching converter, the control variable that is derived from each prevailing period duration influences the gap between the switch-on threshold value and the sawtooth signal of the PWM controller, where the sawtooth signal is influenced with the valley-identifying signal, such that a switch-on point is determined by a prevailing valley until, depending upon the change in the load, it is safe to change to a preceding or subsequent valley so as to determine the switch-on point in time without jumping back to the prevailing valley. In other words, the change in the gap between the switch-on threshold value and the sawtooth signal of the switching regulating unit, the sawtooth signal being influenced with the valley-identifying signal, generates a hysteresis whereby an uncontrolled valley skipping or valley hopping is prevented.

Here, it is advantageous if the gap between the sawtooth signal, which is influenced with the valley identifying signal, and the switch-on threshold value is changed by the control variable in proportion with the change in the load at the output of the switching converter. This means that, for example, in the case of an increasing load, a gap between the switch-on threshold value and the sawtooth signal that is influenced with the valley-identifying signal is enlarged or in the case of a decreasing load, this gap is reduced.

In a preferred embodiment of the invention, for example, a gap between the sawtooth signal, which is influenced with the valley-identifying signal, and the switch-on threshold value is changed by changing a gradient or an incline of a ramp of the sawtooth signal in dependence upon the control variable.

Alternatively, it is possible, for example, to change the gap between the sawtooth signal, which is influenced with the valley-identifying signal, and the switch-on threshold value by changing the switch-on threshold value in dependence upon the control variable. Here, for example, the switch-on threshold is reduced or increased in dependence upon the respective load change.

Furthermore, it is advantageous if, when the control variable reaches the predetermined stable switching frequency, the control variable is reset to a predetermined output value. The control variable is reset, for example, abruptly if the predetermined stable switching frequency or the corresponding associated period duration of the switching signal is ascertained. If the output value is again assumed by the control variable, then the gap to the sawtooth signal of the switching regulating unit, the sawtooth signal being influenced with the valley-identification signal, and the switch-on threshold value is no longer influenced or changed. The output value of the control variable is provided, for example, from the predetermined stable switching frequency of the switching converter or of the associated period duration.

Depending on the realization of the detection of the prevailing period duration, it is possible to determine the prevailing period duration of the switching signal ideally in the form of a digital value or an analogue value. It is possible, for example, to use a microcontroller so as to determine the period duration as a digital value, and the prevailing period duration of the switching signal is measured by the microcontroller. Alternatively, the period duration of the switching signal can be determined via an analogue circuit and the prevailing period duration of the switching signal is output by the analogue circuit as an analogue voltage average value of a sawtooth-like auxiliary voltage that is synchronous with respect to the sawtooth signal of the switching regulating unit. It is possible, however, to also use a frequency voltage converter so as to determine the prevailing period duration of the switching signal, and the prevailing frequency of the typically square waveform switching signal is converted by said frequency voltage converter into a DC voltage that is frequency-dependent or proportional thereto.

It is also an object of the invention to provide a system for regulating a switching converter having at least one switching element in the quasi-resonant operation, where the system is configured so as to implement the method in accordance with the invention and for this purpose comprises at least a switching regulating unit for generating a switching signal and switch-on points in time are predetermined for the at least one switching element of the switching regulator, wherein the switching regulating unit has an oscillator unit for generating a sawtooth signal that is compared with a switch-on threshold value so as to generate the switching signal, a valley-identifying unit for generating a valley-identifying signal that influences the sawtooth signal whereby a respective switch-on point in time of the at least one switching element falls in a valley of an oscillating voltage that is prevailing at the switched-off switching element, a unit for detecting the period duration and for determining a prevailing period duration of the switching signal, a period duration reference unit for predetermining a reference period duration (Tref), and a regulating unit that generates a control variable from the prevailing period duration, which is determined by the unit for detecting the period duration, and the reference period duration of the period duration reference unit so as to change a gap between the sawtooth signal, which is influenced with the valley identifying signal, and the switch-on threshold value.

In the case of the system in accordance with the invention, a further regulating circuit is superimposed over a regulation of a switching converter by a switching regulator. A gap between the sawtooth signal of the switching regulating unit, the sawtooth signal being influenced with the valley-identifying signal, and the switch-on threshold value for determining the switch-on points in time of the switching element of the switching converter is changed or influenced by this further regulating circuit in the case of a load change at the output of the switching regulator in addition so as to regulate the output voltage to a predetermined constant output voltage value such that an uncontrolled jumping back and forth between valleys or an uncontrolled valley-skipping is ideally prevented or inhibited.

For realization of the system in accordance with the invention, it is possible for the unit for detecting the periods to be realized, for example, with the aid of a microcontroller, which determines each prevailing period duration of the switching signal, or a frequency voltage converter. An analogue circuit, for example, represents a more cost-effective realized embodiment of the unit for detecting the periods and the analogue circuit determines the prevailing period duration of the switching signal as an analogue voltage average value of a sawtooth-like auxiliary voltage that is synchronous with respect to the sawtooth signal of the switching regulating unit.

Ideally, the regulating unit that generates the control variable so as to change a gap between the sawtooth signal, which is influenced with the valley-identifying signal, and the switch-on threshold value is embodied as a proportional integral controller.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below in an exemplary manner with reference to the attached figures, in which.

DESCRIPTION OF THE EXEMPLARY EMBODIMENTS

Figure 1:
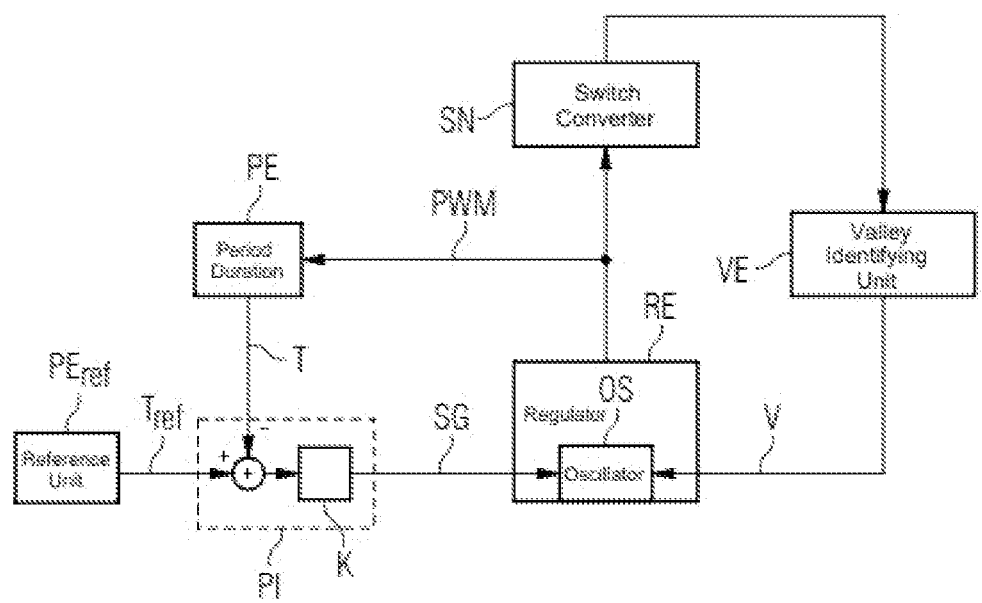
FIG. 1 shows an exemplary schematic block diagram of a system for regulating a quasi-resonant switching switching converter in accordance with the invention.

FIG. 1 is an exemplary illustration of a schematic block diagram of the system for regulating a quasi-resonant switching switching converter SN in accordance with the invention. The system comprises a switching converter SN having at least one switching element that is controlled via a square waveform switching signal PWM. Here, the switch-on points in time for the switching element are predetermined, for example, via rising flanks of the square waveform switching signal PWM. In a regulated state of the switching converter SN, the switching element is typically switched with a predetermined stable switching frequency. This stable switching frequency or an associated period duration is predetermined by the dimensioning of the switching converter SN—in particular the inductances and capacitances and also an efficiency that is to be achieved.

In order to generate the switching signal PWM, the system in accordance with the invention has a switching regulating unit RE that is formed, for example, as a pulse width modulated switching regulator RE. The switching regulating unit RE comprises an oscillator unit OS (for example, sawtooth generator) and a sawtooth signal is generated by the oscillator unit. The sawtooth signal is used so as to generate the switching signal PWM.

Furthermore, a valley-identifying unit VE (for example, zero crossing detector) is provided and a valley-identifying signal V is generated by the valley-identifying unit. For example, an oscillating voltage that is prevailing at the switched-off switching element of the switching converter SN is measured by the valley-identifying unit VE so as to generate the valley-identifying signal V. If a voltage minimum or "valley" is ascertained at the switched-off switching element by the voltage measurement in the voltage curve or a "valley" is determined, then it is possible, for example, for a pulse to be generated by the valley-identifying unit VE as a valley-identifying signal V. The valley-identifying signal V is then supplied to the switching regulating unit RE and at the switching regulating unit influences the sawtooth signal that is generated by the oscillator unit OS.

In the switching regulating unit RE, the sawtooth signal that is influenced with the valley-identifying signal V is compared with a predetermined switch-on threshold value so as to determine the switch-on points in time of the switching element of the switching converter SN. If the sawtooth signal that is influenced with the valley-identifying signal V reaches or exceeds the predetermined switch-on threshold value, then a rising flank is generated in the switching signal PWM, for example, and consequently a switch-on point in time is determined for the at least one switching element of the switching converter SN. By influencing the sawtooth signal with the valley-identifying signal V, it is possible for the switch-on point in time of the at least one switching element of the switching converter SN to fall in a minimum or valley of the oscillating voltage that is prevailing at the switched-off switching element.

The system additionally comprises a unit for detecting the period duration PE and a prevailing period duration T of the switching signal PWM is determined as an analogue value or digital value by the unit for detecting the period duration. One possible embodiment of the unit for detecting the period duration PE, which determines a prevailing period duration T of the switching signal PWM, for example, as an analogue value, is illustrated in an exemplary manner in FIG. 3. In this case, for example, the period duration T is determined as an analogue voltage average value of a respective sawtooth of a sawtooth-like auxiliary voltage that is synchronous with but separate from the sawtooth signal of the switching regulating unit RE.

Alternatively, the unit for detecting the period duration PE can be formed, for example, via a microcontroller and the prevailing period duration T of the switching signal PWM is measured by the microcontroller. Furthermore, the unit for detecting the period duration PE can also be realized, for example, with the aid of a frequency voltage converter and, for example, the prevailing frequency of the typically square waveform switching signal PWM is converted by the frequency voltage converter into a frequency-dependent DC voltage or a DC voltage that is proportional thereto.

Furthermore, a period duration reference unit PEref is provided and a predetermined reference period duration Tref is made available by the period duration reference unit. One possible embodiment of the period duration reference unit PEref is further explained with the aid of FIG. 3. The reference period duration Tref or a voltage value Uref that corresponds to the reference period duration Tref can be set, for example, by a calibration of the regulating system, for example, based on a dimensioning of the switching converter SN (for example, maximum and minimum value of the switching frequency, or inductances) and the switching regulating unit RE, for example, during initial commissioning.

The system further comprises a regulating unit PI that can be formed, for example, as a proportional integral controller or PI controller. The predetermined reference period duration Tref that is made available by the period duration reference unit PEref is supplied to the regulating unit PI as a desired value, and the prevailing period duration T of the switching signal PWM, which has been determined by the unit for detecting the period duration PE, is supplied to the regulating unit as an actual value. The prevailing determined period duration T is compared with the reference period duration Tref by the regulating unit PI or a difference is formed from the reference period duration Tref and the prevailing period duration T. A control variable SG is then derived by the regulating unit PI from a comparison result and the control variable can be amplified, for example, with an amplification factor K. The amplification factor K is predetermined, in this case, for example, by the realization or dimensioning of the PI controller. The control variable SG is then relayed to the switching regulating unit RE and, in the case of a load change at the output of the switching converter SN the control variable at the switching regulating unit, can change a gap between the input threshold value and the sawtooth signal of the oscillator unit OS, where the sawtooth signal is influenced with the valley-identifying signal V, until the predetermined stable switching frequency of the switching converter SN has been ascertained with the aid of the prevailing period duration T, which is determined by the unit for detecting the period duration PE, or by the comparison of the determined prevailing period duration T with the reference period duration Tref.

Figure 2:
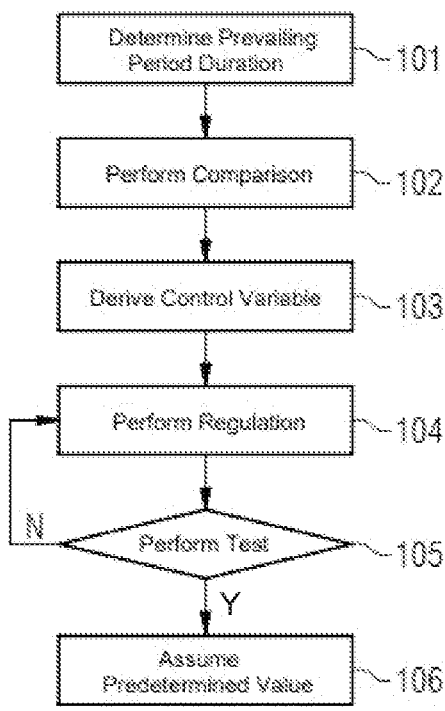
FIG. 2 shows an exemplary flowchart of the method for regulating a switching converter in accordance with the invention.

FIG. 2 illustrates an exemplary flowchart of the method for regulating a quasi-resonant switching switching converter SN in accordance with the invention. For this purpose, in a determining step 101 a prevailing period duration T of the switching signal PWM of the switching regulating unit RE is determined by the unit for detecting the period duration PE. The prevailing period duration T in this case can be determined depending on the realization of the unit for detecting the period duration PE (for example, via the microcontroller, with the aid of a frequency voltage converter or as an analogue circuit) in the form of a digital value or an analogue value.

For a comparison step 102, the determined prevailing period duration T is supplied to a regulating unit PI as an actual value. In the comparison step 102, the determined prevailing period duration T is compared with a predetermined reference period duration Tref. The predetermined reference period duration Tref is, for example, predetermined by a period duration reference unit PEref as a desired value. The comparison between the determined prevailing period duration T and the predetermined reference period duration Tref can be performed by the regulating unit PI, for example, via subtraction of the actual value or the period duration T from the desired value or from the reference period duration Tref.

In a deriving step 103, a control variable SG is derived from a comparison result between the determined, prevailing period duration T and the predetermined reference period duration Tref. The control variable SG can be amplified by the regulating unit PI where applicable with an amplification factor K that is predetermined by a dimensioning or realization of the regulating unit PI. The control variable SG is then relayed to the switching regulating unit RE.

If a change in the load occurs at the output of the switching converter SN or a power requirement at the output changes and thereby the output voltage of the switching converter SN changes, then in a regulating step 104 a gap between the sawtooth signal of the oscillator unit OS of the switching regulating unit RE, the sawtooth signal being influenced with the valley-identifying signal V, and the switch-on threshold value is changed by the control variable SG. Here, the control variable SG can make the gap between the sawtooth signal, which is influenced with the valley-identifying signal V, and the switch-on threshold value, for example, in proportion with the change in the load at the output of the switching converter SN. This means that, for example, in the case of an increasing load, this gap is increased by the control variable SG and for example in the case of a decreasing load, this gap is reduced by the control variable.

The change in the gap between the sawtooth signal that is influenced with the valley-identifying signal V and the switch-on threshold value can be achieved in the regulating step 104, for example, by virtue of the fact that with the aid of the control variable an incline of the sawtooth or a ramp of the sawtooth signal is influenced dependent upon the load change or so as to change the prevailing period duration T of the switching signal PWM that is triggered by the load change. Alternatively, in the case of a change in the load at the output of the switching converter SN, it is possible for the control variable to change a level of the switch-on threshold value in the regulating step 104 dependent upon a respective load change or change of the prevailing period duration T.

The gap between the sawtooth signal, which is influenced with the valley-identifying signal V, and the switch-on threshold value is changed by the control variable SG in the regulating step 104 until ascertaining in a testing step 105 with reference to the determined prevailing period duration T that the predetermined stable switching frequency of the switching converter SN has been reached.

This means that, for example, in the case of an increasing load at the output of the switching converter SN, the prevailing period duration T of the switching signal PWM initially increases owing to the corresponding regulation of the output voltage of the switching converter SN. In the derivation step 103, a control variable SG, for example, is generated by the regulating unit PI and said control variable decreases in proportion with the increasing period duration T. The control variable SG can then for example influence the gap between the sawtooth signal, which is influenced with the valley-identifying signal V, and the switch-on threshold value by virtue of the fact that the incline or the gradient of the sawtooth ramp of the sawtooth signal of the oscillator unit OS likewise decrease in proportion with the increasing period duration T. In other words, the sawtooth ramp becomes flatter and the switch-on point in time of the switching element of the switching converter SN is furthermore determined by a prevailing valley of the oscillating voltage that is prevailing at the switched-off switching element. If the switch-on threshold value is reached or exceeded at a point in time of a preceding valley on account of the changed sawtooth signal that is influenced with the valley-identifying signal V, then it is identified in the testing step 105 with reference to the determined prevailing period duration T that the switching frequency has abruptly returned to the value of the predetermined stable switching frequency, which renders possible a stable switch-on or in which case a stable operating point of the switching converter SN is achieved.

In the case of a decreasing load at the output of the switching converter SN, for example, the prevailing period duration T of the switching signal PWM decreases owing to the corresponding regulation of the output voltage of the switching converter. The control variable SG that is derived from the determined prevailing period duration T in the derivation step 103 increases owing to the decrease of the prevailing period duration T. The control variable SG can then influence, for example, the gap between the sawtooth signal, which is influenced with the valley-identifying signal V, and the switch-on threshold value by virtue of the fact that the incline or the gradient of the sawtooth ramp of the sawtooth signal of the oscillator unit OS likewise increases in proportion with the decreasing period duration T. In other words, the sawtooth ramp is steeper and the switch-on point in time of the switching element of the switching converter SN is furthermore determined by a prevailing valley of the oscillating voltage that is prevailing at the switched-off switching element. If the switch-on threshold value is reached or exceeded at a point in time of a subsequent valley owing to the changed sawtooth signal, which is influenced with the valley identifying signal V, then in the testing step 105 with reference to the determined prevailing period duration T whether the switching frequency has abruptly returned to the value of the predetermined stable switching frequency is identified, which renders possible a stable switch-on or in which case a stable operating point of the switching converter SN is achieved.

If it has been identified in the testing step 105 that the prevailing switching frequency has reached the value of the predetermined stable switching frequency, then the control variable SG again assumes a predetermined value in a returning step 106. This output value can be determined, for example, by the predetermined stable switching frequency or the associated period duration T and the predetermined reference period duration Tref.

Figure 3:
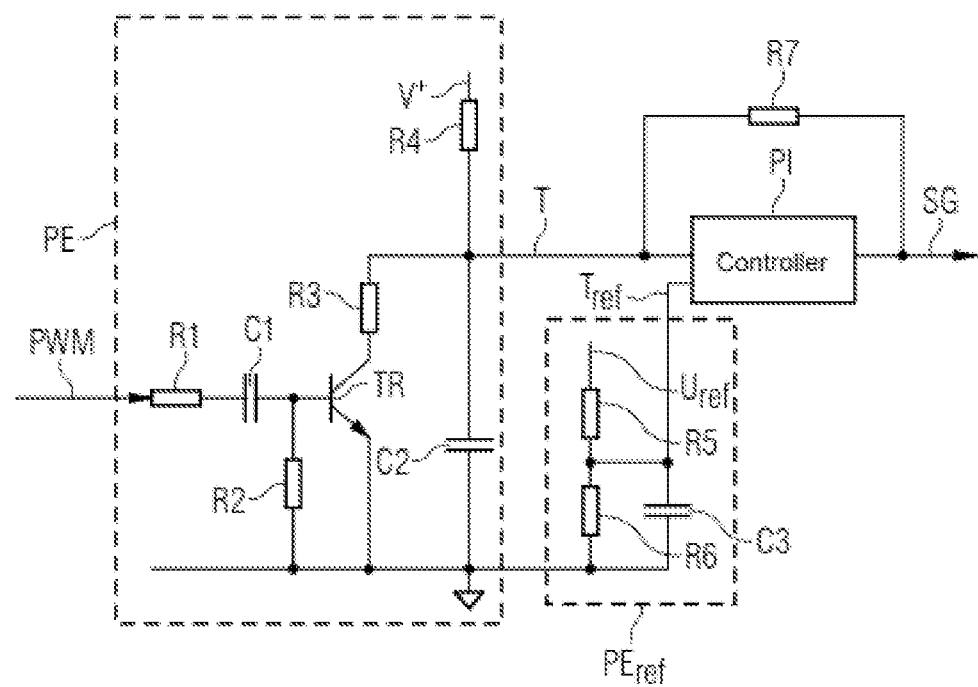
FIG. 3 shows an exemplary schematic manner an analogue embodiment of the system for regulating a quasi-resonant switching converter in accordance with the invention.

FIG. 3 an exemplary schematic illustration of an embodiment of the system for regulating a switching converter SN, in particular an analogue embodiment of the unit for detecting the period duration PE, the period duration reference unit PEref and the regulating unit PI.

Here, the exemplary embodiment of the unit for detecting the period duration PE comprises a series circuit of a first resistor R1 and a first capacitor C1 that is connected to a base of a transistor TR (for example bipolar transistor). Furthermore, the base of the transistor TR is connected to a reference potential via a second resistor R2. An emitter of the transistor TR is likewise connected to the reference potential and a third resistor R3 is connected to a collector of the transistor TR. A second capacitor C2 is arranged parallel to the transistor TR and the third resistor R3, and said second capacitor on the one hand has a connection to the third resistor R3 in a connecting point. The second capacitor C2 is connected to a voltage V+ via a fourth resistor R4, where the second capacitor C2 forms an integrator circuit with the fourth resistor. Furthermore, the second capacitor is likewise connected to the reference potential.

In order to determine the prevailing period duration, the second capacitor C2 is discharged via the series circuit of the first resistor R1 and first capacitor C1 and the transistor TR in the case of the rising flank of the switching signal PWM. Here, the rising flank of the switching signal PWM corresponds to a switch-on point in time of the switching element of the switching converter SN in a prevailing valley. The second capacitor C2 can be re-charged via the fourth resistor R4, which acts like a current source, until the second capacitor C2 is again discharged in the case of a next positive flank of the switching signal PWM, i.e., the next switch-on point in time of the switching element of the switching converter SN. This leads to an integration of the prevailing period duration T of the switching signal PWM in the connecting point between the third resistor R3, the fourth resistor R4 and the second capacitor C2. The prevailing period duration T of the switching signal PWM is determined in an analogue average voltage average value, which is dependent upon the prevailing period duration T, of a sawtooth that is derived from the switching signal PWM, owing to the connection of the series circuit of the first resistor R1 and first capacitor C1, the transistor TR and the integrator circuit comprising the second capacitor C2 and the fourth resistor R4. Here, for example, a longer period duration T provides a higher voltage average value than a shorter period duration T or a shorter period duration T provides a lower voltage average value than a longer period duration T.

FIG. 3 additionally illustrates an embodiment of the period duration reference unit PEref and a reference period duration Tref or a corresponding reference voltage value is made available by the period duration reference unit. The period duration reference unit PEref comprises a fifth and sixth resistor R5, R6 that are connected to a reference voltage Uref and a reference potential. Furthermore a third capacitor is arranged parallel to the sixth resistor R6.

The reference period duration Tref or the corresponding reference voltage value is then supplied as a desired value to the regulating unit PI, for example, a proportional integral controller or PI controller. Furthermore, the prevailing period duration T or the analogue voltage average value that is dependent upon the prevailing period duration T is supplied to the PI controller PI as an actual value. These two values are compared by the PI controller PI and the control variable SG is derived therefrom and the control variable is amplified with the amplification factor K that is dependent upon the dimensioning of the regulating unit PI. The control variable SG is then relayed to the switching regulating unit RE in order, for example, to influence an incline or the ramp of the sawtooth signal of the oscillator OS in dependence upon a prevailing change of the period duration T. Furthermore, in order to close the regulating circuit, the control variable SG is returned via a seventh resistor R7 as feedback to the input of the PI controller PI and the prevailing period duration T is supplied to said PI controller.

Alternatively, in lieu of the incline of the ramp of the sawtooth signal of the oscillator unit OS it is possible, via the control variable SG, to influence the switch-on threshold value dependent upon the change of the prevailing period duration T. For this purpose, the control variable SG can be, for example, inverted.

The PI controller PI can be realized, for example, with the aid of an operation amplifier having corresponding circuitry (for example, resistors, and/or capacitors), where the reference period duration Tref or the corresponding voltage value is supplied to a positive input of the operation amplifier and the prevailing period duration T or the analogue voltage average value that is derived from the prevailing period duration T via the unit for detecting the period PE is supplied to an inverted input of the operation amplifier. The control variable SG is returned, for example, via the seventh resistor R7 to the inverted input of the operation amplifier or the PI controller PI.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for regulating a switching converter having at least one switching element in a quasi-resonant operation, the at least one switching element being switched in a regulated state of the switching converter at a predetermined stable switching frequency, and switch-on points in time of the at least one switching element being predetermined by a switching signal which is generated via a sawtooth signal, which is influenced with a valley-identifying signal, reaching a switch-on threshold value, and a respective switch-on point in time of the at least one switching element falls in a valley of an oscillating voltage which is prevailing when the at least one switching element is switched off due to the valley-identifying signal, the method comprising:

determining a prevailing period duration of the switching signal;

comparing the determined prevailing period duration of the switching signal with a predetermined reference period duration;

deriving a control variable from the comparison of the determined prevailing period duration with the reference period duration; and changing, in cases of a change in a load at an output of the switching converter by the control variable, a gap between the sawtooth signal, which is influenced with the valley-identifying signal, and the switch-on threshold value until, with reference to the determined prevailing period duration, ascertaining the predetermined stable switching frequency is reached.

2. The method as claimed in claim 1, wherein the gap between the sawtooth signal, which is influenced with the valley-identifying signal, and the switch-on threshold value is changed by the control variable in proportion with the change in the load at the output of the switching converter.

3. The method as claimed in claim 1, wherein the gap between the sawtooth signal, which is influenced with the valley-identifying signal, and the switch-on threshold value is changed by changing a gradient of a ramp of the sawtooth signal in dependence upon the control variable.

4. The method as claimed in claim 2, wherein the gap between the sawtooth signal, which is influenced with the valley-identifying signal, and the switch-on threshold value is changed by changing a gradient of a ramp of the sawtooth signal in dependence upon the control variable.

5. The method as claimed in claim 1, wherein the gap between the sawtooth signal, which is influenced with the valley-identifying signal, and the switch-on threshold value is changed by changing the switch-on threshold value in dependence upon the control variable.

6. The method as claimed in claim 2, wherein the gap between the sawtooth signal, which is influenced with the valley-identifying signal, and the switch-on threshold value is changed by changing the switch-on threshold value in dependence upon the control variable.

7. The method as claimed in claim 1, wherein the control variable is reset to a predetermined output value when the predetermined stable switching frequency is reached.

8. The method as claimed in claim 1, wherein the prevailing period duration of the switching signal is determined in the form of a digital value or analogue value.

9. A system for regulating a switching converter having at least one switching element which is operated in a quasi-resonant operation, the at least one switching element being switched in a regulated state of the switching converter at a predetermined stable switching frequency, the system comprising:

a switching regulating unit for generating a switching signal and switch-on points in time predetermined for the at least one switching element of the switching regulator, the switching regulating unit including an oscillator unit for generating a sawtooth signal which is compared with a switch-on threshold value to generate the switching signal;

a valley-identifying unit for generating a valley-identifying signal which influences the sawtooth signal such that a respective switch-on point in time of the at least one switching element falls in a valley of an oscillating voltage which is prevailing when the at least one switching element is switched off;

a unit for detecting a period duration, said unit determining a prevailing period duration of the switching signal;

a period duration reference unit for predetermining a reference period duration; and a regulating unit which generates a control variable from the prevailing period duration, which is determined by the unit for detecting the period duration, and the reference period duration of the period duration reference unit so as to change a gap between the sawtooth signal, which is influenced with the valley identifying signal, and the switch-on threshold value.

10. The system as claimed in claim 9, wherein the unit for detecting the period is realized via one of a microcontroller and a frequency voltage converter.

11. The system as claimed in claim 9, wherein the unit for detecting the period comprises an analogue circuit which determines the prevailing period duration of the switching signal as an analogue voltage average value of a sawtooth-like auxiliary voltage which is synchronous with respect to the sawtooth signal of the switching regulating unit.

12. The system as claimed in claim 9, wherein the regulating unit comprises a proportional integral controller.

13. The system as claimed in claim 10, wherein the regulating unit comprises a proportional integral controller.

14. The system as claimed in claim 11, wherein the regulating unit comprises a proportional integral controller.

* * * * *